US012157299B2

(12) United States Patent
Sato

(10) Patent No.: US 12,157,299 B2
(45) Date of Patent: Dec. 3, 2024

(54) PRINTING APPARATUS, PRINTING METHOD, AND NON-TRANSITORY COMPUTER-READABLE STORAGE MEDIUM

(71) Applicant: CANON KABUSHIKI KAISHA, Tokyo (JP)

(72) Inventor: Ryosuke Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 17/557,928

(22) Filed: Dec. 21, 2021

(65) Prior Publication Data

US 2022/0203714 A1 Jun. 30, 2022

(30) Foreign Application Priority Data

Dec. 25, 2020 (JP) ................................ 2020-217372

(51) Int. Cl.

*B65H 7/12* (2006.01)
*B41J 11/00* (2006.01)
*B41J 11/42* (2006.01)

(52) U.S. Cl.

CPC ............ *B41J 11/0095* (2013.01); *B41J 11/42* (2013.01); *B65H 7/125* (2013.01); *B65H 2513/10* (2013.01); *B65H 2701/1311* (2013.01); *B65H 2701/1313* (2013.01)

(58) Field of Classification Search

CPC ................................................. B65H 29/6618
See application file for complete search history.

(56) References Cited

U.S. PATENT DOCUMENTS 5,072,306 A * 12/1991 Matsumoto ........ H04N 1/00567 399/385
7,731,436 B2 6/2010 Lee et al.
7,770,881 B2 * 8/2010 Yokemura .......... H04N 1/00602 271/10.13
8,827,440 B2 9/2014 Inokuchi et al.
8,905,658 B2 12/2014 Yamaguchi (Continued)

FOREIGN PATENT DOCUMENTS

CN 1911668 A 2/2007
CN 101909896 A 12/2010

(Continued)

OTHER PUBLICATIONS

Office Action dated May 19, 2023, in Chinese Application No. 202111535912.5.

(Continued)

*Primary Examiner* — Howard J Sanders
(74) *Attorney, Agent, or Firm* — Venable LLP

(57) ABSTRACT

A printing apparatus includes a print unit configured to print an image on a print medium, a conveyance unit configured to convey a print medium to the print unit, a first feed unit configured to feed a first print medium to the conveyance unit, a second feed unit configured to feed a second print medium to the conveyance unit, and a control unit configured to control the first feed unit, the second feed unit, and the conveyance unit. The control unit is configured to start, in a state in which the first print medium is being conveyed by the conveyance unit, feeding of the second print medium to the conveyance unit by the second feed unit.

14 Claims, 6 Drawing Sheets

(56) References Cited

U.S. PATENT DOCUMENTS

| | | | |
|---|---|---|---|
| 9,050,840 | B2 | 6/2015 | Sakamoto et al. |
| 9,284,140 | B2 | 3/2016 | Horaguchi |
| 9,290,023 | B2 | 3/2016 | Kudo |
| 9,586,780 | B2 | 3/2017 | Nishida et al. |
| 9,849,696 | B2 | 12/2017 | Prebensen et al. |
| 10,603,932 | B2 | 3/2020 | Aida |
| 10,843,493 | B2 | 11/2020 | Sakurai et al. |
| 11,027,563 | B2 | 6/2021 | Yamashita et al. |
| 2010/0149242 | A1 | 6/2010 | Takahashi et al. |
| 2015/0256694 | A1 | 9/2015 | Suzuki et al. |

FOREIGN PATENT DOCUMENTS

| | | | | |
|---|---|---|---|---|
| CN | 104417056 | A | | 3/2015 |
| CN | 104708918 | A | | 6/2015 |
| CN | 104742537 | A | | 7/2015 |
| CN | 110154555 | A | | 8/2019 |
| CN | 110281663 | A | | 9/2019 |
| CN | 110549738 | A | | 12/2019 |
| JP | 2000062975 | A | * | 2/2000 |
| JP | 2001-347652 | A | | 12/2001 |
| JP | 2013-014048 | A | | 1/2013 |
| JP | 2015-168237 | A | | 9/2015 |
| JP | 2016037355 | A | * | 3/2016 |
| WO | 2010/050245 | A1 | | 5/2010 |

OTHER PUBLICATIONS

Extended European Search Report dated May 20, 2022, in European Patent Application No. 21214752.4.

Office Action dated Nov. 22, 2023, in Chinese Patent Application No. 202111535912.5.

Office Action dated Sep. 6, 2024, in Japanese Patent Application No. 2020-217372.

* cited by examiner

PRINTING APPARATUS, PRINTING METHOD, AND NON-TRANSITORY COMPUTER-READABLE STORAGE MEDIUM

BACKGROUND OF THE INVENTION

Field of the Invention

The present invention relates to a printing apparatus.

Description of the Related Art

As a method for improving the printing speed of a printing apparatus, there has been proposed a technique with an improved feeding method. Japanese Patent Laid-Open No. 2015-168237 discloses a technique of, when continuously printing images on a plurality of print media, conveying the print media with the leading end portion of the succeeding print medium overlapping the preceding print medium.

A printing apparatus including a plurality of feed mechanisms is advantageous in that it can perform printing on print media of different sizes or the like. In such a printing apparatus, there is room for improvement of an operation upon switching the print medium in terms of improvement in throughput.

SUMMARY OF THE INVENTION

The present invention provides a technique that can achieve improvement in throughput in a printing apparatus that can switch a print medium.

According to one aspect of the present invention, there is provided a printing apparatus comprising: a print unit configured to print an image on a print medium; a conveyance unit configured to convey a print medium to the print unit; a first feed unit configured to feed a first print medium to the conveyance unit; a second feed unit configured to feed a second print medium to the conveyance unit; and a control unit configured to control the first feed unit, the second feed unit, and the conveyance unit, wherein the control unit is configured to start, in a state in which the first print medium is being conveyed by the conveyance unit, feeding of the second print medium to the conveyance unit by the second feed unit.

Further features of the present invention will become apparent from the following description of exemplary embodiments (with reference to the attached drawings).

DESCRIPTION OF THE EMBODIMENTS

Figure 1:
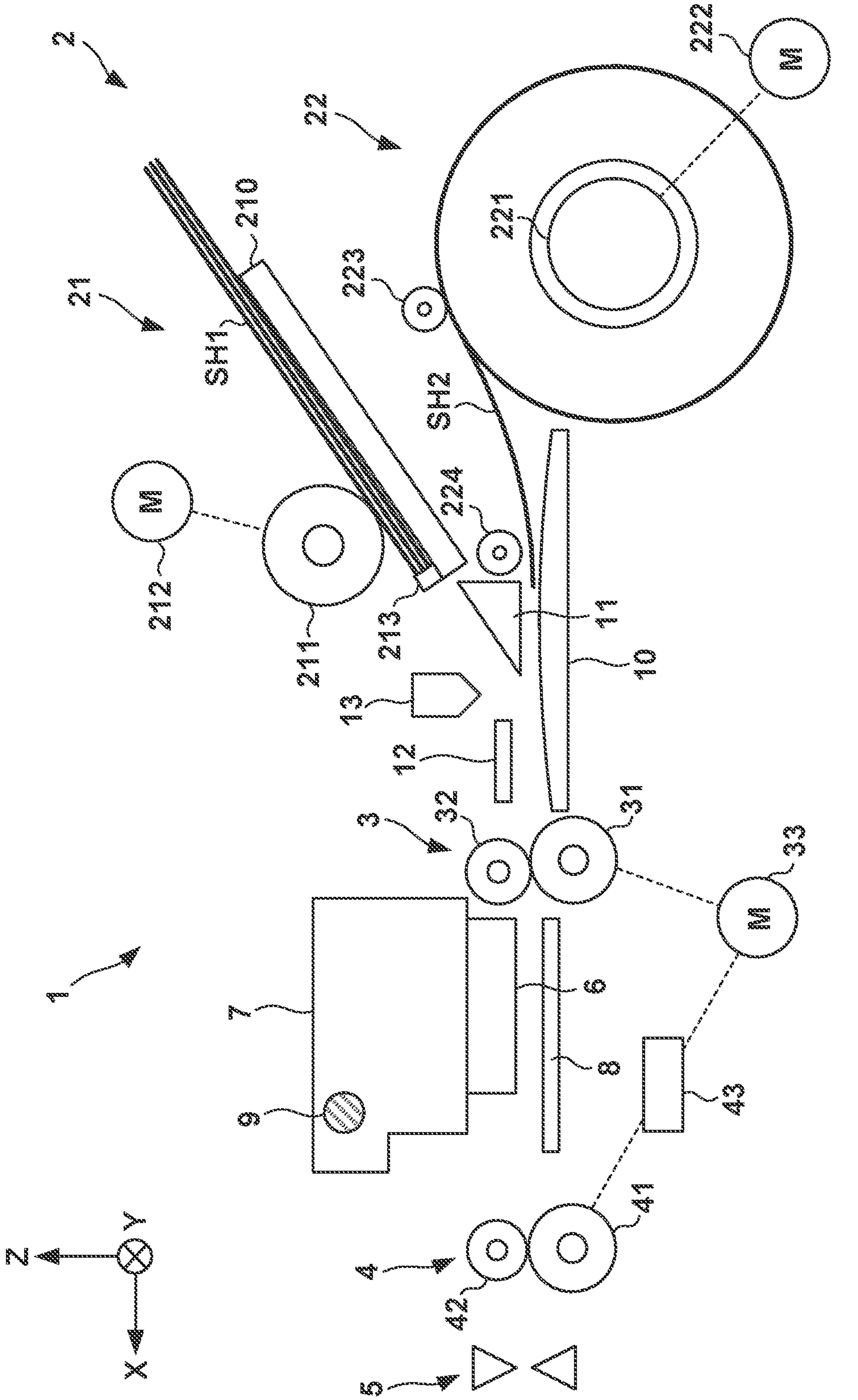
FIG. 1 is a schematic view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Outline of Printing Apparatus>

FIG. 1 is a schematic view of a printing apparatus 1 according to this embodiment. In this embodiment, a case will be described in which the present invention is applied to a serial type inkjet printing apparatus, but the present invention is also applicable to printing apparatuses of other types. In the drawings, an arrow X and an arrow Y indicate horizontal directions orthogonal to each other, and an arrow Z indicates a vertical direction. A downstream side and an upstream side are based on the conveyance direction of a print medium.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, a plastic film, and the like may be used as print media.

The printing apparatus 1 includes, as a mechanism for conveying a print medium, a feed unit 2, a conveyance unit 3, and a discharge unit 4, which are arranged from the upstream side in the conveyance direction of a print medium. The feed unit 2 includes a feed unit 21 which feeds a sheet SH1 as a print medium, and a feed unit 22 which feeds, as a print medium, a sheet SH2 different from the sheet SH1. In this embodiment, the print media for printing can be selectively fed by the two feed units 21 and 22.

The feed unit 21 includes a feeder tray 210 (stacking portion) on which a plurality of the sheets SH1 can be stacked, a feed roller 211, and a separation portion 213. The sheet SH1 is a cut sheet (to be sometimes referred to as the cut sheet SH1 hereinafter) stacked on the feeder tray 210 in a posture in which the widthwise direction of the sheet SH1 matches the Y direction. The feed roller 211 is rotated by a driving force of a feed motor 212, and abuts against the top cut sheet SH1 stacked on the feeder tray 210, thereby conveying it to the downstream side. The separation portion 213 is provided in the downstream-side end portion of the feeder tray 210. The separation portion 213 has a structure (for example, separation claws) which separates the cut sheets SH1 on the feeder tray 210 one by one upon conveying the cut sheets SH1 by the feed roller 211.

The sheet SH2 is a roll sheet obtained by winding one sheet into a roll form around a cylindrical core (to be sometimes referred to as the roll sheet SH2). The feed unit 22 includes a support portion 221 which rotatably supports the roll sheet SH2. The roll sheet SH2 is supported in a posture in which the widthwise direction of the roll sheet SH2 (the axial direction of the roll) matches the Y direction. The support portion 221 is rotated by a driving force of a feed motor 222, thereby rotating the roll sheet SH2. Depending on the rotation direction of the feed motor 222, a feed operation of feeding the roll sheet SH2 to the downstream side and a winding operation can be performed. The feed unit 22 includes a roller 223 which is pressed against the outer peripheral surface of the roll sheet SH2 by a spring or the like (not shown). The roller 223 is a free rotating body, and presses the outer peripheral surface of the roll sheet SH2 such that the feed operation and the winding operation of the roll sheet SH2 are stably performed.

A rotation of the support portion 221 causes the roll sheet SH2 to pass between a sheet guide 10 and a roller 224, which is a free rotating body arranged so as to face the sheet guide 10, and be conveyed to the downstream side. The conveyance path of the cut sheet SH1 and the conveyance path of the roll sheet SH2 are merged at a merging portion on the downstream side of a partition member 11. The conveyance path after merging passes between the sheet guide 10 and a sheet guide 12 facing the sheet guide 10 and reaches the conveyance unit 3.

The conveyance unit 3 conveys the print medium (cut sheet SH1 or roll sheet SH2) conveyed by the feed unit 2 to a printhead 6. The conveyance unit 3 includes a driving roller 31 and a driven roller 32 (pinch roller) pressed against the driving roller 31 by a spring or the like (not shown). The driving roller 31 is rotated by a driving force of a conveyance motor 33. A forward rotation of the conveyance motor 33 causes the print medium to be nipped in a nip portion between the driving roller 31 and the driven roller 32, and the print medium (cut sheet SH1 or roll sheet SH2) is conveyed between the printhead 6 and a platen 8 facing the printhead 6 to the downstream side in the X direction. Upon the winding operation of the roll sheet SH2, a backward rotation of the conveyance motor 33 can cause the conveyance unit 3 to convey the roll sheet SH2 to the upstream side.

The discharge unit 4 conveys the print medium (cut sheet SH1 or roll sheet SH2) conveyed by the conveyance unit 3 to the outside of the apparatus. The discharge unit 4 includes a driving roller 41 and a spur 42 pressed against the driving roller 41 by a spring or the like (not shown). The driving roller 41 is rotated by a driving force of the conveyance motor 33, and conveys the print medium to the downstream side in the X direction. The driving force of the conveyance motor 33 is transmitted to the driving roller 41 via a transmission mechanism 43. The transmission mechanism 43 includes, for example, a one-way clutch, and does not transmit the driving force of the conveyance motor 33 to the driving roller 41 when the conveyance motor 33 reversely rotates. Note that in this embodiment, the conveyance motor 33 is shared by the conveyance unit 3 and the discharge unit 4, but an arrangement may be used in which individual motors are provided.

A cutting unit 5 is provided on the downstream side of the discharge unit 4. The cutting unit 5 cuts the roll sheet SH2 having undergone printing. The cutting unit 5 includes, for example, a cutter including circular round blades arranged one above and one below and a moving mechanism (not shown) that moves the cutter in a direction (the Y direction in this embodiment) intersecting the conveyance direction of the print medium. The cutter stands by outside the conveyance path of the print medium. At the time of cutting, the cutter is moved so as to cross the conveyance path, thereby cutting the roll sheet SH2.

The printhead 6 is arranged on the downstream side of the conveyance unit 3 and the upstream side of the discharge unit 4 in the conveyance direction of the print medium. The printhead 6 performs printing on the print medium (cut sheet SH1 or roll sheet SH2). In this embodiment, the printhead 6 is an inkjet printhead that performs printing on a print medium by discharging ink. The printhead 6 is supported by a carriage 7. The carriage 7 is reciprocated in the direction intersecting the print medium. In this embodiment, the carriage 7 is reciprocated in the Y direction by the guide of a guide shaft 9 extending in the Y direction.

As has been described above, the printing apparatus 1 in this embodiment is a serial type printing apparatus in which the printhead 6 is mounted on the carriage 7. By repeating a conveyance operation (intermittent conveyance operation) of conveying the print medium by a predetermined amount by the conveyance unit 3 and an image forming operation performed while the conveyance by the conveyance unit 3 is stopped, a printing operation of the print medium is performed. The image forming operation is an operation of discharging ink from the printhead 6 while moving the carriage 7 mounted with the printhead 6.

The printing apparatus 1 includes a detection unit 13. The detection unit 13 detects the print medium at a position on the upstream side of the conveyance unit 3 and on the downstream side of the feed unit 2. The detection unit 13 is, for example, an optical sensor that detects the print medium. Alternatively, the detection unit 13 is formed by, for example, an arm member which is provided in the conveyance path of the print medium so as to be swingable and swings due to interference with the print medium, and a sensor that detects the swinging motion of the arm member.

Control Unit

Figure 2:
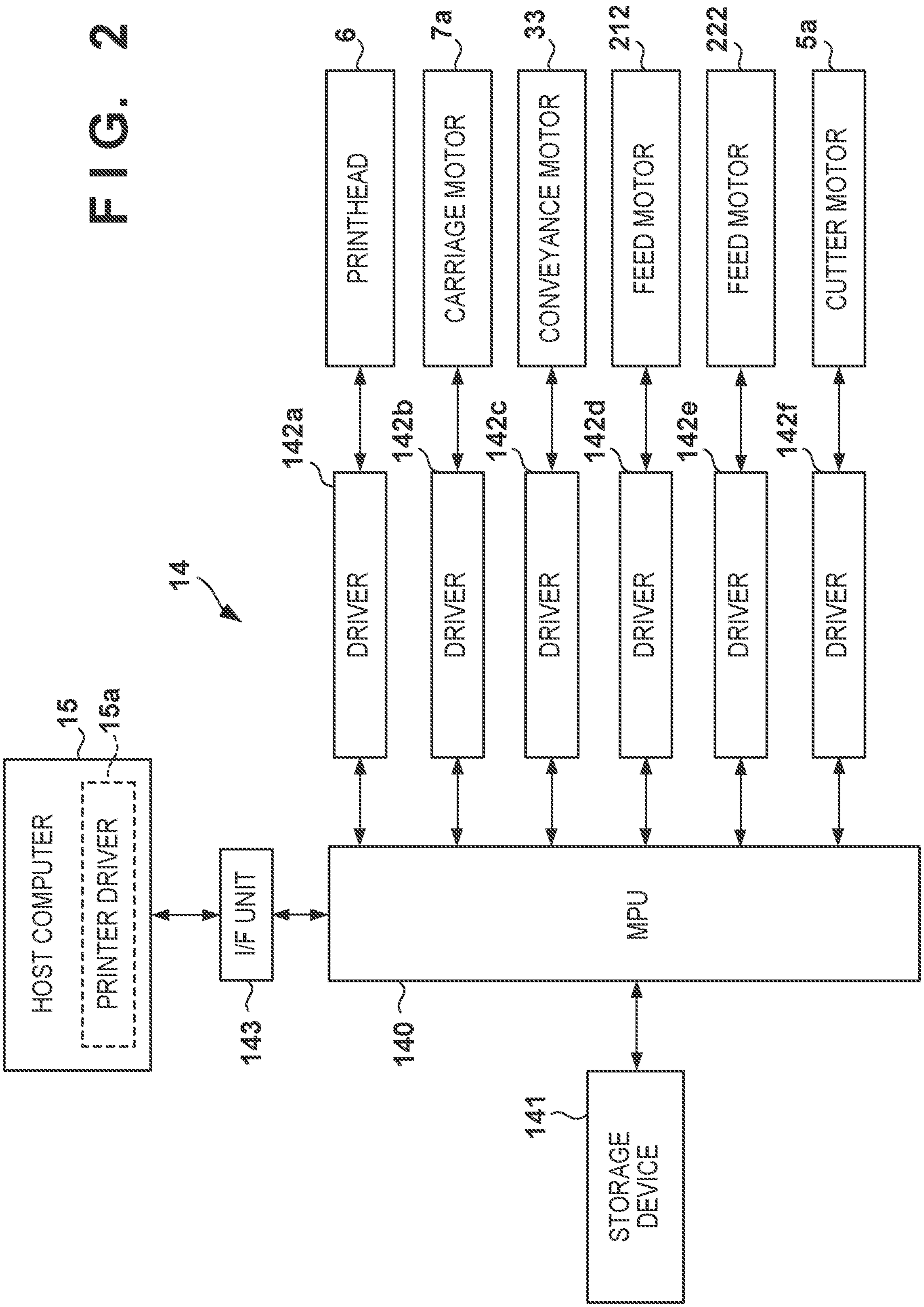
FIG. 2 is a block diagram of a control unit of the printing apparatus 1 shown in FIG. 1.

FIG. 2 is a block diagram of a control unit 14 of the printing apparatus 1. An MPU 140 is a processor that controls respective operations of the printing apparatus 1, and controls data processing and the like. The MPU 140 controls the entire printing apparatus 1 by executing programs stored in a storage device 141. The storage device 141 is formed by, for example, a ROM or a RAM. The storage device 141 stores, in addition to programs executed by the MPU 140, various kinds of data required for processing such as data received from a host computer 15.

The MPU 140 controls the printhead 6 via a driver 142*a*. A carriage motor 7*a* is a driving source for moving the carriage 7, and the MPU 140 controls the carriage motor 7*a* via a driver 142*b*. The MPU 140 also controls the conveyance motor 33, the feed motors 212 and 222, and a cutter motor 5*a* via drivers 142*c* to 142*f*, respectively. The cutter motor 5*a* is a driving source of the cutting unit 5.

The host computer 15 is, for example, a personal computer or a mobile terminal (for example, a smartphone, a tablet terminal, or the like) used by a user. The host computer 15 is installed with a printer driver 15*a* which performs communication between the host computer 15 and the printing apparatus 1. The printing apparatus 1 includes an interface unit 143, and communication between the host computer 15 and the MPU 140 is performed via the interface unit 143. For example, when the user inputs an execution instruction of a printing operation to the host computer 15, the printer driver 15*a* collects data of an image to be printed and setting regarding the printing (information such as the quality of the print image), and instructs the printing apparatus 1 to execute the printing operation. An execution instruction of a printing operation is sometimes referred to as a print job.

Feed Mode

In the printing apparatus 1, it is possible to selectively feed the cut sheet SH1 and the roll sheet SH2 from the feed unit 2 to the conveyance unit 3 in accordance with a print job. Further, in a case in which one print job includes printing on a plurality of pages or in a case in which different print jobs are continuously instructed, it is possible to continuously feed the print media.

As a control mode for continuous feeding, for example, one of control modes described below can be performed.

Pattern 1: a mode in which after the cut sheet 1 is fed, another cut sheet 1 is fed Pattern 2: a mode in which feeding and cutting of the roll sheet SH2 is repeated Pattern 3: a mode in which after the cut sheet SH1 is fed, the roll sheet SH2 is fed Pattern 4: a mode in which after the roll sheet SH2 is fed, the cut sheet SH1 is fed In the case of Pattern 4, after the preceding roll sheet SH2 is cut, the roll sheet SH2 is wound up by the feed unit 22, thereby retreating the leading end of the roll sheet SH2 to the upstream side of the detection position of the detection unit 13. After that, conveyance of the cut sheet SH1 to the conveyance unit 3 by the feed unit 21 is started.

In the case of Pattern 1 or Pattern 3, it is possible to perform a conveyance mode (to be sometimes referred to as successive overlapped conveyance) in which the leading end portion of the succeeding print medium is overlapped with the preceding print medium and the overlap portion is conveyed by the conveyance unit 3. This can achieve improvement in throughput.

In the successive overlapped conveyance in Pattern 1, at a timing when the trailing end portion of the preceding cut sheet SH1 is located on the upstream side of the conveyance unit 3, feeding of the succeeding cut sheet SH1 is started. Then, on the upstream side of the conveyance unit 3, the trailing end portion of the preceding cut sheet SH1 and the leading end portion of the succeeding cut sheet SH1 are overlapped with each other. When the conveyance unit 3 is driven, the overlap portion is nipped and conveyed by the conveyance unit 3, so that the two cut sheets SH1 including the preceding and succeeding cut sheets SH1 are simultaneously conveyed.

In successive overlapped conveyance in Pattern 3, at a timing when the trailing end portion of the preceding cut sheet SH1 is located on the upstream side of the conveyance unit 3, feeding of the succeeding roll sheet SH2 is started. Then, on the upstream side of the conveyance unit 3, the trailing end portion of the preceding cut sheet SH1 and the leading end portion of the succeeding roll sheet SH2 are overlapped with each other. When the conveyance unit 3 is driven, the overlap portion is nipped and conveyed by the conveyance unit 3, so that the preceding cut sheet SH1 and the succeeding roll sheet SH2 are simultaneously conveyed.

The user can set using the host computer 15 whether to employ any one of the control modes of Patterns 1 to 4 and whether to perform the successive overlapped conveyance. The information of the control mode or the like selected by the user is instructed to the printing apparatus 1 via the printer driver 15*a*. Further, the control mode may be changed on the printing apparatus 1 side if the user permits it by setting. For example, assume a case in which the Y-direction width of the cut sheet SH1 is equal to that of the roll sheet SH2. If the user has set to select Pattern 1 but the cut sheet SH1 is run out, the control mode is changed to Pattern 3 and printing is performed using the roll sheet SH2.

Control Example

An example of control performed by the MPU 140 will be described. When print data is transmitted from the host computer 15 via the I/F unit 143, it is processed by the MPU 140 and then deployed in the storage device 141. The MPU 140 starts a printing operation based on the deployed data.

Figure 3:
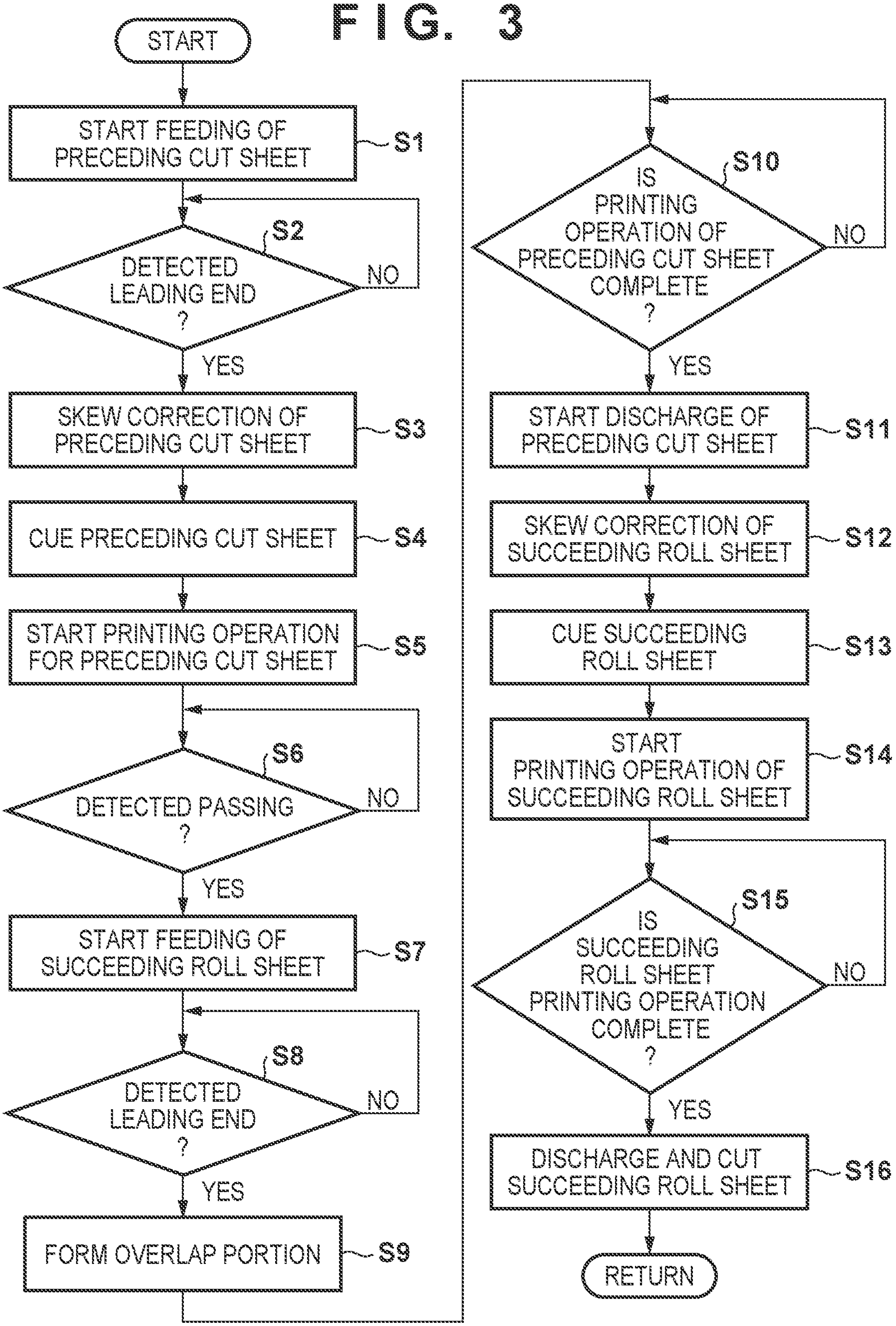
FIG. 3 is a flowchart illustrating an example of processing performed by the control unit shown in FIG. 2.

Here, a processing example for feeding control in a case in which a condition for performing successive overlapped conveyance of Pattern 3 is met (for example, the user gave a selection instruction) will be mainly described. FIG. 3 is a flowchart illustrating the processing example, and FIGS. 4A to 6C are views for explaining an operation of the printing apparatus 1.

In step S1, feeding (conveyance by the feed unit 21) of the last cut sheet SH1 before switching of the print medium from the cut sheet SH1 to the roll sheet SH2 is performed. By rotation of the feed roller 211, the top cut sheet SH1 (preceding cut sheet) stacked on the feeder tray 210 is picked up and fed toward the conveyance unit 3.

Figure 4A:
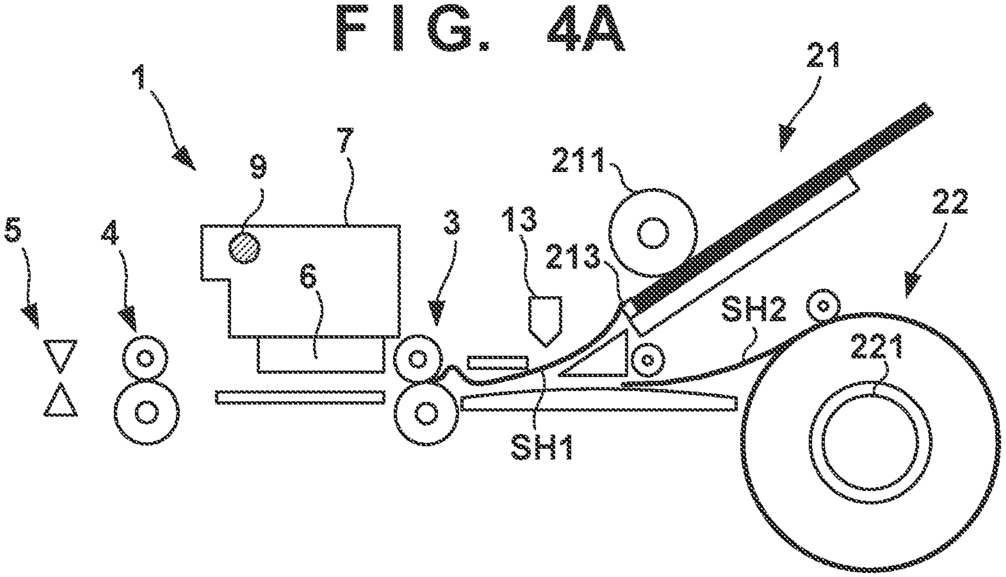
FIGS. 4A to 4C are views for explaining an operation of the printing apparatus shown in FIG. 1.

In step S2, it is determined whether the detection unit 13 detects passage of the leading end of the preceding cut sheet SH1. If the leading end is detected, the cut sheet SH1 is conveyed by a predetermined amount, and skew correction of the cut sheet SH1 is performed in step S3. The skew correction is performed by, in a state in which the conveyance unit 3 is stopped, making the leading end of the preceding cut sheet SH1 abut against the nip portion between the conveyance roller 31 and the driven roller 32 and continuing feeding by a predetermined conveyance amount. FIG. 4A exemplarily shows a skew correction operation.

Figure 4B:
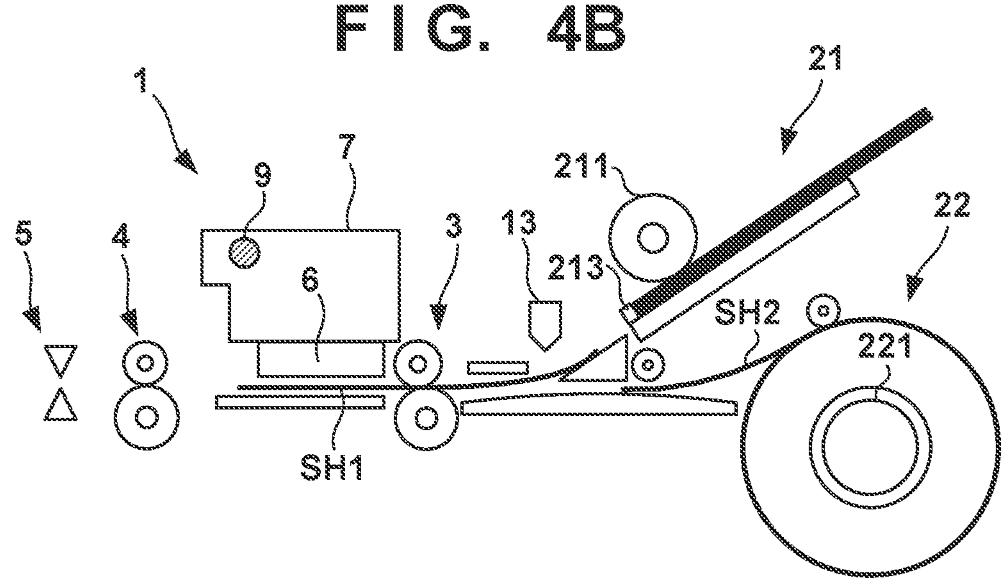

In step S4, the conveyance unit 3 is driven based on the print data, and cueing (registration) of the preceding cut sheet SH1 is performed. That is, using the position of the conveyance unit 3 as a reference, the preceding cut sheet SH1 is conveyed to a printing start position where the preceding cut sheet SH1 faces the printhead 6. In step S5, the printing operation of the preceding cut sheet SH1 is performed. FIG. 4B exemplarily shows a state during the printing operation. The preceding cut sheet SH1 undergoes image printing by the printhead 6 while being conveyed to the downstream side.

Figure 4C:
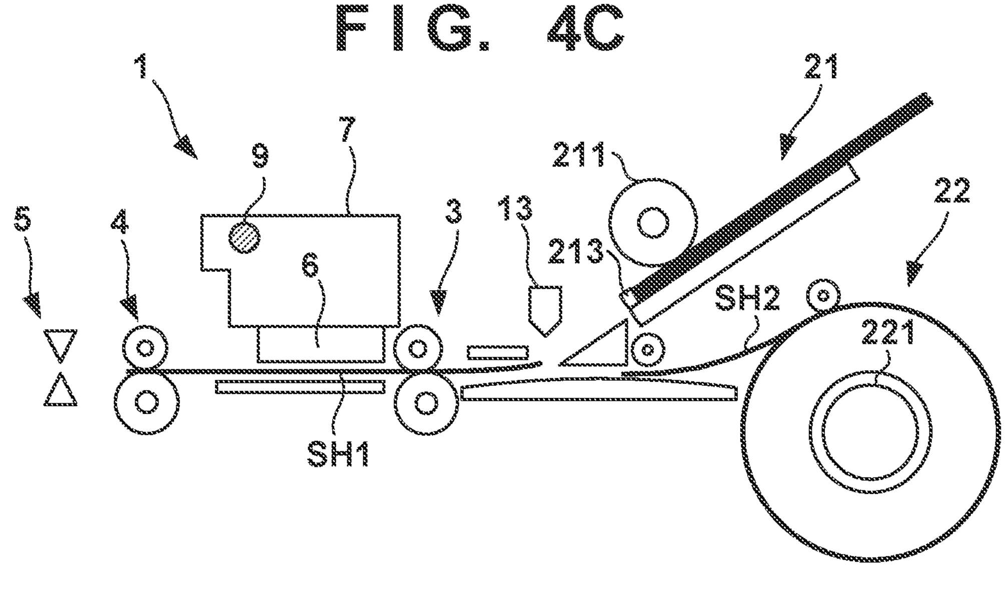

In step S6, it is determined whether a timing of starting feeding of the succeeding roll sheet SH2 has arrived. If the successive overlapped conveyance has been selected, feeding (conveyance by the feed unit 22) of the succeeding roll sheet SH2 is started at the stage where the preceding cut sheet SH1 is being conveyed by the conveyance unit 3 (in other words, before the preceding cut sheet SH1 passes through the conveyance unit 3). In this embodiment, feeding of the succeeding roll sheet SH2 is started when the detection unit 13 detects passage of the preceding cut sheet SH1 (detects the trailing end of the preceding cut sheet SH1). If it is detected in step S6 that the preceding cut sheet SH1 has passed through the detection unit 13, driving of the feed motor 212 of the feed unit 21 is stopped, and the process advances to step S7. FIG. 4C exemplarily shows a state in which the preceding cut sheet SH1 has passed through the detection unit 13. The preceding cut sheet SH1 has reached the discharge unit 4.

In step S7, feeding of the succeeding roll sheet SH2 is started. The conveyance speed of the succeeding roll sheet SH2 by driving of the feed motor 222 is set higher than the conveyance speed of the preceding cut sheet SH1. This enables decreasing the distance between the succeeding roll sheet SH2 and the preceding cut sheet SH1.

In step S8, if the detection unit 13 detects that the leading end of the succeeding roll sheet SH2 has passed through the detection unit 13, the process advances to step S9. In step S9, by controlling the conveyance amount of the succeeding roll sheet SH2, an overlap portion between the trailing end portion of the preceding cut sheet SH1 and the leading end portion of the succeeding roll sheet SH2 is formed.

Figure 5A:
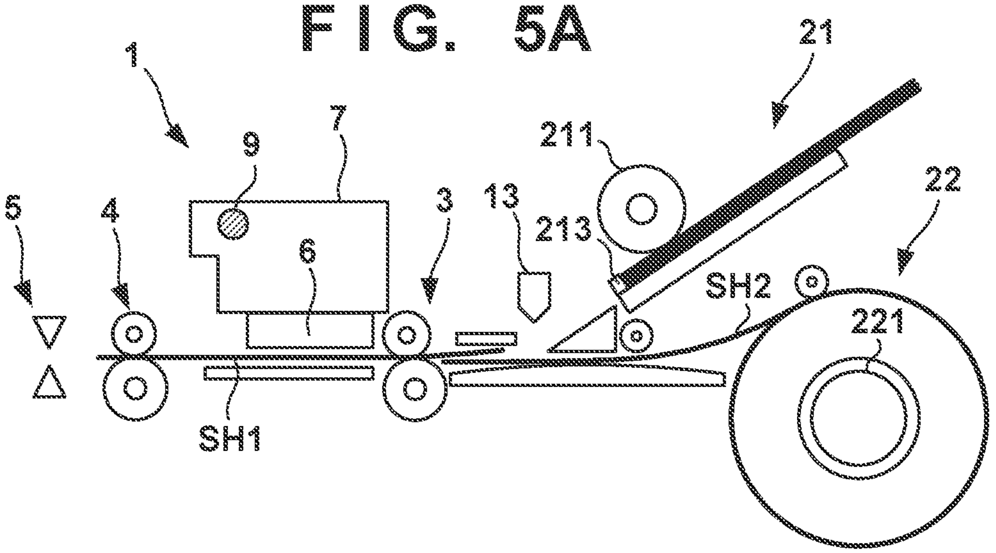
FIGS. 5A to 5C are views for explaining the operation of the printing apparatus shown in FIG. 1.

FIG. 5A shows a mode in which the overlap portion has been formed. In this embodiment, the succeeding roll sheet SH2 is overlapped with the lower side (the surface opposite to the printing surface by the printhead 6) of the preceding cut sheet SH1. When giving priority to the printing quality of the preceding cut sheet SH1, the overlap portion is set as a margin region in the trailing end portion of the preceding cut sheet SH1. On the other hand, when giving priority of throughput, the overlap portion may extend to the printing region. Note that, depending on the printing condition such as the width of the margin region of the preceding cut sheet SH1, the overlap portion may not be formed even if successive overlapped conveyance has been selected. Even in this case, by starting conveyance of the succeeding roll sheet SH2 by the feed unit 22 at the stage where the preceding cut sheet SH1 is being conveyed by the conveyance unit 3, the distance between the sheets can be decreased and the throughput can be improved.

If the overlap portion is formed in step S9, along with the printing operation of the preceding cut sheet SH1, the overlap portion is nipped and conveyed by the conveyance unit 3. Thus, the preceding cut sheet SH1 and the succeeding roll sheet SH2 are simultaneously conveyed by the conveyance unit 3. The conveyance of the roll sheet SH2 by the feed unit 22 is controlled synchronously with the conveyance unit 3.

In step S10, it is determined if the printing operation of the preceding cut sheet SH1 is completed. If it is completed, the process advances to step S11. In step S11, a discharge operation of the preceding cut sheet SH1 to the outside of the apparatus is started. During the discharge operation of the preceding cut sheet SH1, the conveyance unit 3 may be driven not intermittently as in the printing operation but continuously.

Figure 5B:
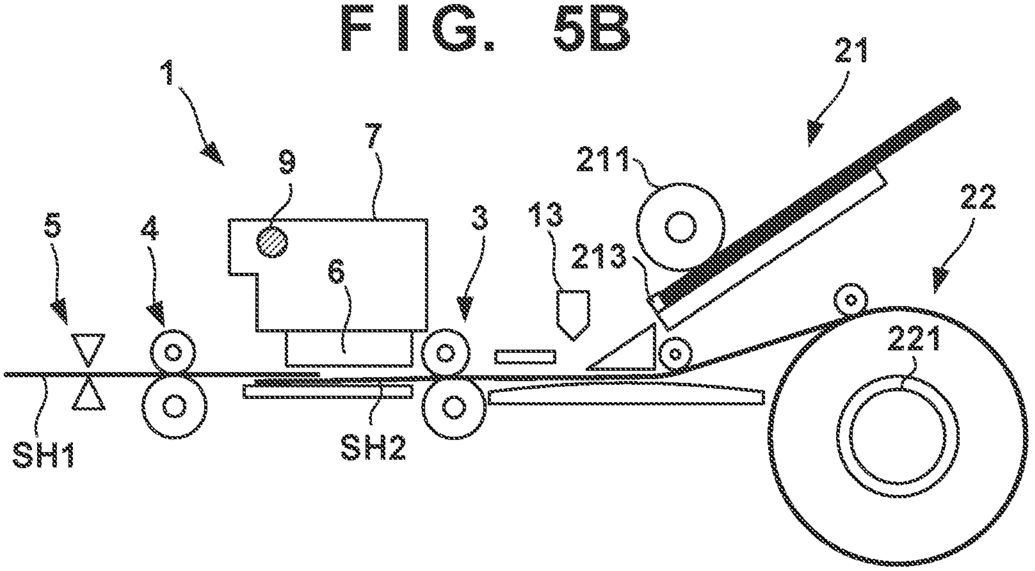

During the discharge operation of the preceding cut sheet SH1, skew correction of the succeeding roll sheet SH2 is performed in step S12. In this embodiment, the skew of the roll sheet SH2 is corrected by performing tension generation control to generate a tension in the roll sheet SH2 between the conveyance unit 3 and the feed unit 22. FIG. 5B exemplarily shows a skew correction mode of the roll sheet SH2.

By conveying the roll sheet SH2 by the conveyance unit 3 in the state in which a tension is generated in the roll sheet SH2, the conveyance amount fluctuates in the widthwise direction (Y direction) of the roll sheet SH2 in accordance with the degree of skew. This can correct the skew of the roll sheet SH2. Since this skew correction operation is performed after the printing operation of the preceding cut sheet SH1, it does not influence the printing operation of the preceding cut sheet SH1.

The tension in the roll sheet SH2 can be generated by tension generation control of controlling the feed unit 22. For example, the conveyance speed (feed speed) of the roll sheet SH2 by the feed unit 22 is reduced to be lower than that by the conveyance unit 3. Alternatively, for example, the feed unit 22 is driven in the winding direction in a range in which the conveyance by the conveyance unit 3 is continued, thereby giving resistance to the conveyance of the roll sheet SH2 by the conveyance unit 3.

Figure 5C:
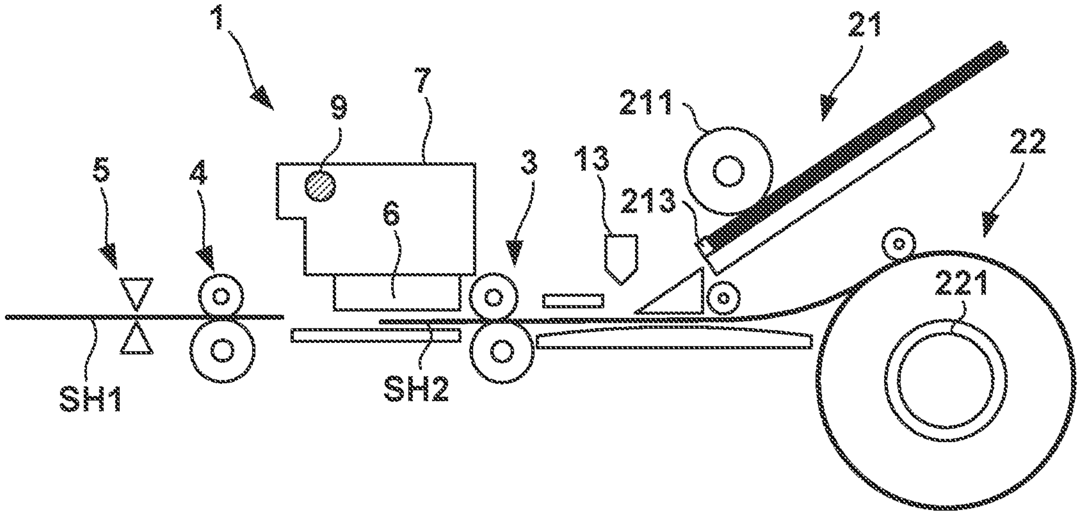

In step S13, cueing of the succeeding roll sheet SH2 is performed. The cueing is performed by, after rewinding the succeeding roll sheet SH2, driving the conveyance unit 3 based on the print data of the image to be printed on the succeeding roll sheet SH2. The rewinding is performed up to a position where the leading end of the succeeding roll sheet SH2 is nipped in the nip portion of the conveyance unit 3. After that, using the position of the conveyance unit 3 as a reference, the succeeding roll sheet SH2 is conveyed to the printing start position where the succeeding roll sheet SH2 faces the printhead 6. FIG. 5C exemplarily shows a mode in which the cueing of the succeeding roll sheet SH2 is completed. The cueing of the succeeding roll sheet SH2 can be performed during the discharge operation of the preceding cut sheet SH1 as long as the preceding cut sheet SH1 has passed through the conveyance unit 3. FIG. 5C shows an example in which the cueing of the succeeding roll sheet SH2 is completed before the preceding cut sheet SH1 passes through the discharge unit 4. As has been described above, in this embodiment, it is possible to perform the cueing of the succeeding roll sheet SH2 early, so that the throughput can be improved.

Figure 6A:
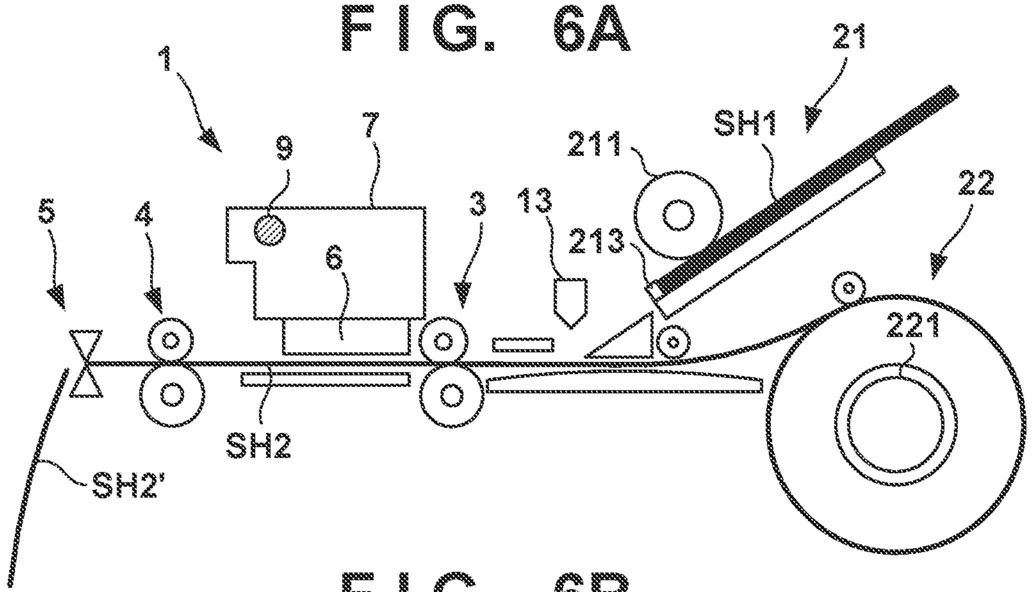
FIGS. 6A to 6C are views for explaining the operation of the printing apparatus shown in FIG. 1.

In step S14, a printing operation of the succeeding roll sheet SH2 is started. In step S15, it is determined whether the printing operation of the succeeding roll sheet SH2 is completed. If the printing operation is completed, the process advances to step S16. In step S16, a discharge operation of the succeeding roll sheet SH2 is performed. If the trailing end of the succeeding roll sheet SH2 reaches the cutting unit 5, the discharge is stopped and the succeeding roll sheet SH2 is cut by the cutting unit 5. FIG. 6A exemplarily shows the cutting mode. A printed cut sheet SH2' is cut out from the succeeding roll sheet SH2. With this, one processing ends.

Figure 6B:
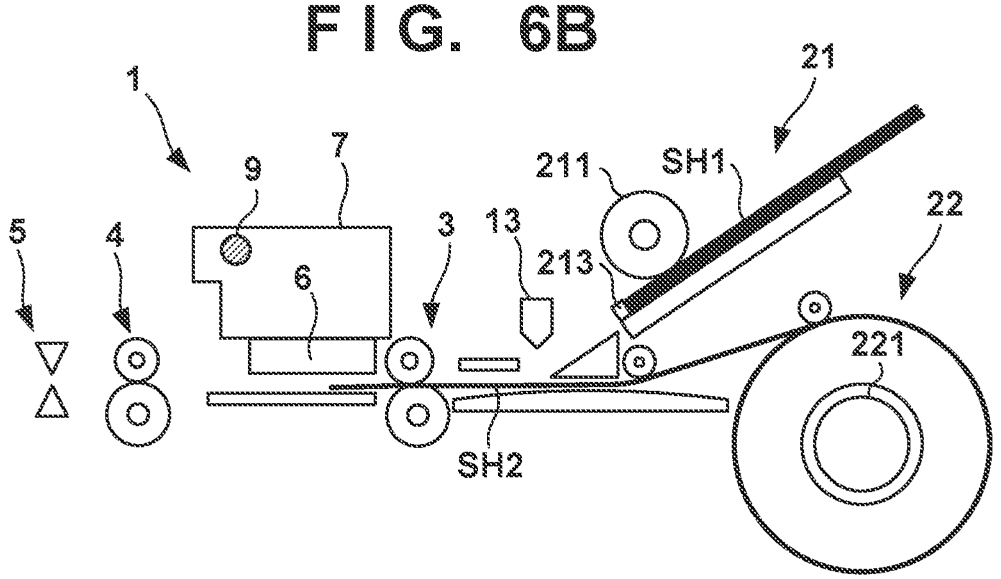
Figure 6C:
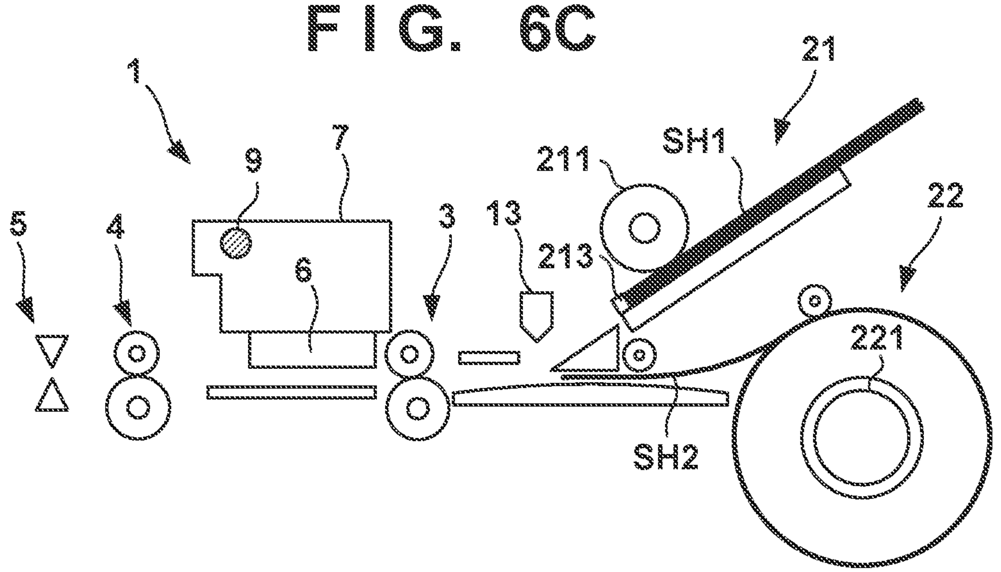

Thereafter, if a printing operation of the roll sheet SH2 is performed, the roll sheet SH2 is wound up, cueing is performed as exemplarily shown in FIG. 6B, and the printing operation is performed. If a printing operation of the cut sheet SH1 is performed, as exemplarily shown in FIG. 6C, the roll sheet SH2 is wound up such that the leading end thereof is located on the downstream of the detection position of the detection unit 13, and feeding and the printing operation of the cut sheet SH1 are advanced.

As has been described above, according to this embodiment, at the stage where the preceding cut sheet SH1 is being conveyed by the conveyance unit 3, conveyance of the succeeding roll sheet SH2 by the feed unit 22 is started. After printing on the preceding cut sheet SH1, printing on the succeeding roll sheet SH2 can be started early. Accordingly, it is possible to quickly switch the print medium in the printing apparatus 1 that can switch the print medium, so that the throughput can be improved. Further, it is possible to overlap the leading end portion of the succeeding roll sheet SH2 with the preceding cut sheet SH1, so that the throughput can be further improved. Furthermore, it is possible to perform skew correction and cueing of the succeeding roll sheet SH2 during discharge of the preceding cut sheet SH1, so that the throughput can be further improved.

Other Embodiments

In the embodiment described above, the arrangement has been exemplarily shown in which the feed unit 2 includes the two feed units 21 and 22. However, three or more feed units may be included. The Y-direction size (width) of the cut sheet SH1 may be equal to or different from that of the roll sheet SH2. The cut sheet SH1 and the roll sheet SH2 have been exemplarily shown as the print media to be fed, but a combination of cut sheets of different kinds may be used. The kind may be at least one of the size, thickness, and material of the cut sheet.

Various arrangements can be selected as the arrangements of the feed units 21 and 22. For example, a mode called a rear tray may be employed in which the feed unit is arranged on the rear upper side of the apparatus, or a mode called a cassette may be employed in which the feed unit is arranged on the lower side of the printing apparatus. The arrangements of the feed units 21 and 22 may be interchanged.

A leading end detection sensor, which detects the leading end of a sheet, may be provided in the carriage 7, and a detection result of the leading end detection sensor may be utilized for cueing of the roll sheet SH2. As the leading end detection sensor, an optical sensor can be used. In cueing of the roll sheet SH2, the roll sheet SH2 may be conveyed or rewound up to the position where the leading end of the roll sheet SH2 is detected by the leading end detection sensor, and then the roll sheet SH2 may be conveyed to the position corresponding to the print data.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-217372, filed Dec. 25, 2020, which is hereby incorporated by reference herein in its entirety.

What is claimed is:

1. A printing apparatus comprising:

a print unit configured to print an image on a print medium;

a conveyance roller configured to convey a print medium to the print unit;

a first feed unit configured to feed a first print medium to the conveyance roller;

a second feed unit configured to feed a second print medium to the conveyance roller; and a control unit configured to control the first feed unit, the second feed unit, and the conveyance roller, wherein the first print medium is a cut sheet, the second print medium is a roll sheet, in a case in which the roll sheet is to be printed on after the cut sheet, the control unit is configured to start, in a state in which the cut sheet is facing the print unit and being conveyed by the conveyance roller, feeding of the roll sheet to the conveyance roller by the second feed unit, and the control unit is configured to perform a cueing operation of the succeeding roll sheet after the preceding cut sheet has passed through the conveyance roller.

2. The apparatus according to claim 1, wherein a leading end portion of the succeeding roll sheet is overlapped with the preceding cut sheet, and an overlap portion thereof is conveyed to the print unit by the conveyance roller.

3. The apparatus according to claim 1, wherein a conveyance speed of the roll sheet is higher than a conveyance speed of the cut sheet.

4. The apparatus according to claim 1, further comprising:

a detection unit configured to detect the print medium at a position on an upstream side of the conveyance roller and on a downstream side of the first feed unit and the second feed unit in a conveyance direction of the print medium, wherein feeding of the roll sheet is started when the cut sheet has passed through the detection unit.

5. The apparatus according to claim 1, wherein the control unit is configured to perform tension generation control to generate a tension in the roll sheet between the conveyance roller and the second feed unit.

6. The apparatus according to claim 1, wherein after printing on the preceding cut sheet by the print unit is completed, the control unit is configured to perform tension generation control to generate a tension in the roll sheet between the conveyance roller and the second feed unit.

7. The apparatus according to claim 1, wherein the control unit is configured to perform tension generation control to generate a tension in the roll sheet between the conveyance roller and the second feed unit by decreasing a conveyance speed of the second feed unit.

8. The apparatus according to claim 1, further comprising:

a discharge unit arranged on a downstream side of the print unit in a conveyance direction of the print medium, and configured to convey the print medium, wherein the control unit is configured to perform the cueing operation of the succeeding roll sheet before the preceding cut sheet passes through the discharge unit.

9. The apparatus according to claim 8, wherein the cueing operation includes winding up of the roll sheet by the second feed unit and conveyance of the roll sheet to the print unit by the conveyance roller.

10. The apparatus according to claim 1, wherein the cueing operation includes winding up of the roll sheet by the second feed unit and conveyance of the roll sheet to the print unit by the conveyance roller.

11. The apparatus according to claim 1, wherein the conveyance roller is a driving roller against which a driven roller is pressed.

12. The apparatus according to claim 1, wherein in accordance with a user selection, the control unit is configured to perform:

control for starting feeding of the roll sheet to the conveyance roller by the second feed unit in a state in which the cut sheet is being conveyed by the conveyance roller; or control for starting conveyance of the roll sheet to the conveyance roller by the second feed unit after the cut sheet has passed through the conveyance roller.

13. The apparatus according to claim 1, further comprising:

a cutting unit configured to cut the roll sheet after printing by the print unit, wherein after cutting of a preceding roll sheet and after winding up of the roll sheet by the second feed unit, the control unit is configured to start conveyance of the cut sheet to the conveyance roller by the first feed unit.

14. A control method of a printing apparatus including a print unit configured to print an image on a print medium, a conveyance roller configured to convey a print medium to the print unit, a first feed unit configured to feed a first print medium to the conveyance roller, and a second feed unit configured to feed a second print medium to the conveyance roller, the first print medium being a cut sheet, and the second print medium being a roll sheet, the method comprising:

starting printing on the first print medium by the print unit;

in a case in which the roll sheet is to be printed on after the cut sheet, starting feeding of the roll sheet to the conveyance roller by the second feed unit in a state in which the cut sheet is facing the print unit and being conveyed by the conveyance roller; and performing a cueing operation of the succeeding roll sheet after the preceding cut sheet has passed through the conveyance roller.

* * * * *